United States Patent [19]

Fluck

[11] Patent Number: 4,955,794

[45] Date of Patent: Sep. 11, 1990

[54] APPARATUS FOR FORMING AND CONVEYING GROUPS OF FLAT STACKED ITEMS

[75] Inventor: René Fluck, Schleitheim, Switzerland

[73] Assignee: SIG Schweizerische Industrie-Gesellschaft, Neuhausen am Rheinfall, Switzerland

[21] Appl. No.: 254,681

[22] Filed: Oct. 7, 1988

[30] Foreign Application Priority Data

Oct. 15, 1987 [CH] Switzerland .......................... 4045/87

[51] Int. Cl.$^5$ ............................................. B65G 57/03
[52] U.S. Cl. ................................... 414/790.4; 53/253; 53/532; 53/536; 414/793.9; 414/794.2; 414/924; 414/790
[58] Field of Search ............... 414/789.9, 793.4, 793.9, 414/794.2, 794.3, 790.6, 924, 926, 790.4, 790; 53/253, 532, 540, 536, 244, 247

[56] References Cited

U.S. PATENT DOCUMENTS

| | | | |
|---|---|---|---|
| 2,556,214 | 6/1951 | Pottle | 414/790.4 X |
| 2,794,637 | 6/1957 | Rugg | 414/793.9 X |
| 3,122,230 | 2/1964 | Bogue | 414/793.9 X |
| 3,219,202 | 11/1965 | Huffman | 414/793.9 X |
| 3,267,531 | 8/1966 | Buttkereit et al. | 414/793.4 X |
| 3,542,214 | 11/1970 | Helms | 414/924 X |
| 3,641,735 | 2/1972 | Daily et al. | 414/794.2 X |
| 3,664,084 | 5/1972 | Meckley | 53/253 X |
| 4,045,940 | 9/1977 | White et al. | 53/540 X |
| 4,209,960 | 7/1980 | Deutschlander et al. | 53/502 |
| 4,662,152 | 5/1987 | Simelunas et al. | 53/246 |
| 4,785,611 | 11/1988 | Haserbalg | 53/536 |
| 4,807,741 | 2/1989 | Simelunas et al. | 414/790.4 X |
| 4,895,487 | 1/1990 | Fluck | 53/532 X |

FOREIGN PATENT DOCUMENTS

| | | | |
|---|---|---|---|
| 0245042 | 5/1963 | Australia | 414/790.4 |
| 2713205 | 9/1978 | Fed. Rep. of Germany | . |
| 1413970 | 11/1975 | United Kingdom | . |
| 2044230 | 10/1980 | United Kingdom | . |
| 159754 | 9/1981 | United Kingdom | 414/793.9 |

Primary Examiner—Robert J. Spar
Assistant Examiner—William M. Hienz
Attorney, Agent, or Firm—Spencer & Frank

[57] ABSTRACT

A stacking apparatus for forming groups of face-to-face contacting flat items comprises a supply conveyor for advancing a column of serially arranged, flat-lying items; a stack-forming unit situated in a charging station and arranged for sequentially receiving the items from the supply conveyor; a plurality of stacking containers for acommodating a stack of the items; an arrangement for positioning an empty stacking container in the charging station; a stop arranged in the charging station for arresting each item in the stack-forming unit upon delivery by the supply conveyor; an intermittent drive for causing the stack-forming unit to cyclically deposit an item in the stacking container to form an article stack therein; and a sensor which generates a signal indicating a presence of an item to be deposited by the stack-forming unit and which is situated upstream of the stack-forming unit. The signal is applied to the intermittent drive for actuating the same. There are further provide a removal conveyor for moving away filled stacking containers from the stack-forming unit; and an arrangement for transferring a filled stacking container from the charging station to the removal conveyor.

9 Claims, 5 Drawing Sheets

APPARATUS FOR FORMING AND CONVEYING GROUPS OF FLAT STACKED ITEMS

BACKGROUND OF THE INVENTION

This invention relates to a method and an apparatus for forming and conveying groups of face-to-face contacting flat articles, particularly confectionery items such as biscuits, crackers or cookies. The manufacturing apparatus, such as a baking oven, discharges the items in a flat-lying orientation onto a first conveying mechanism which delivers them to a stacking device in which an article stack is formed. The article stack is then advanced on a second conveyor to a packing machine. The stacking apparatus comprises an abutment against which the articles supplied by the first conveyor abut, a sensor responding to the passage of an article on the first conveyor and a mechanism for a stepwise advance of a stack-forming unit.

A method and an apparatus as outlined above is described, for example, in German Offenlegungsschrift (non-examined published application) 2,713,205. The apparatus is arranged immediately upstream of a packing machine and forms, from a column of biscuits delivered by a baking oven, a biscuit stack by means of a stack-forming unit. The latter comprises two spoked (star-shaped) rollers which rotate in opposite directions with respect to one another, about respective axes oriented parallel to the direction of article advance. The articles are, by means of a first conveyor belt, pushed into longitudinally extending recesses of the rollers and abut a stop provided with a sensor. When the pressure on the sensor has attained a predetermined value, the rollers are stepwise rotated by one division so that the article column situated in the rollers is lifted or lowered and the subsequent articles are pushed into the next opening of the star-shaped rollers When the article stack has reached a predetermined height, a ram pushes the stack transversely to the direction of conveyance of the first conveyor belt onto a second conveyor belt which advances the stack to the packing machine.

The above-outlined known apparatus has a very small storing capacity because the articles are advanced to the stack-forming unit in columns in a flat-lying orientation and these columns may contain only few items for a determined length. A large storage capacity, however, is desirable, particularly for an optimal utilization of the capacity of the packing machine to permit absorption of short-period stoppages and, in case of longer standstills, a switchover to a standby packing machine should be possible without generating waste.

Apparatus having a significantly increased storage capacity are known, for example, from British Patent No. 2,044,230 which teaches that the biscuits, after emerging from the baking oven, are arranged to form a column in an edgewise upstanding, face-to-face contacting orientation. The column may then be advanced via storage tracks, deflector switches and dosing devices to the packing machines, as described, for example, in U.S. Pat. No. 4,209,960 or British Patent No. 1,413,970. It is a disadvantage of these arrangements that the biscuits are exposed to significant stresses on the conveyor tracks.

U.S. Pat. No. 4,662,152 discloses an apparatus for forming an article stack in a packaging container. As in the earlier-noted German Offenlegungsschrift No. 2,713,705, the articles are supplied to the stacking apparatus on a conveyor belt, forming a column thereon, in a flat-lying, longitudinally spaced orientation. The terminal length portion of the conveyor belt is pivotal and is, in synchronism with the incoming articles, stepwise lifted so that the articles may be inserted into the laterally open packaging containers from the bottom upward. In order to ensure such synchronism, upstream of the conveyor belt abutment fingers are arranged which arrest the articles and permit advance thereof to the conveyor belt in a predetermined cadence. In this arrangement too, the storage capacity is significantly limited

SUMMARY OF THE INVENTION

It is an object of the invention to provide an improved method and apparatus for stacking and conveying flat articles, operating with a large storage capacity and ensuring a gentle handling of the articles.

These objects and others to become apparent as the specification progresses, are accomplished by the invention, according to which, briefly stated, the stacking apparatus for forming groups of face-to-face contacting flat items comprises a supply conveyor for advancing a column of serially arranged, flat-lying items; a stack-forming unit situated in a charging station and arranged for sequentially receiving the items from the supply conveyor; a plurality of stacking containers for accommodating a stack of the items; an arrangement for positioning an empty stacking container in the charging station; a stop arranged in the charging station for arresting each item in the stack-forming unit upon delivery by the supply conveyor; an intermittent drive for causing the stack-forming unit to cyclically deposit an item in the stacking container to form an article stack therein; and a sensor which generates a signal indicating a presence of an item to be deposited by the stack-forming unit and which is situated upstream of the stack-forming unit. The signal is applied to the intermittent drive for actuating the same. There are further provided a removal conveyor for moving away filled stacking containers from the stack-forming unit; and an arrangement for transferring a filled stacking container from the charging station to the removal conveyor.

DESCRIPTION OF THE PREFERRED EMBODIMENTS

Figure 1:
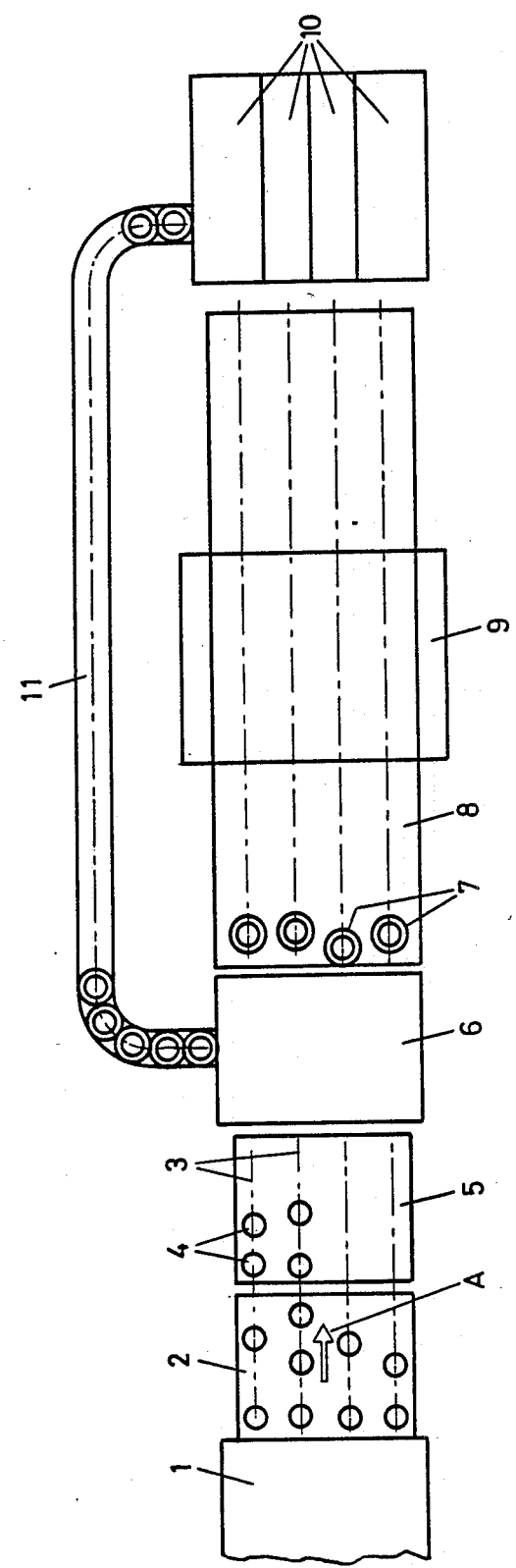
FIG. 1 is a schematic plan view of a production line incorporating the invention.

Turning to FIG. 1, the production line schematically shown therein comprises a continuous baking oven 1 which discharges a plurality of columns 3 consisting of flat-lying, consecutive biscuits 4 onto a plate conveyor chain 2. The conveyor chain 2 transfers the articles 4 in the conveying direction A to a conveyor belt 5 which, in turn, leads to a stacking apparatus 6 in which the items 4 of each column 3 are stacked in a superposed state in respective containers 7, one aligned with each column 2. The filled containers 7 are advanced on a second conveyor belt 8 to a plurality of packing machines 10 with the intermediary of a storage device 9 which expediently includes a device for uniformly distributing the containers 7 to the operational packing machines 10. Immediately upstream of or in the packing machines 10 the article stacks are removed from the containers 7. The empty containers 7 are returned on a third conveyor belt 11 to the stacking apparatus 6.

Thus, the randomly spaced articles 4 are, immediately after their emergence from the baking oven 1, vertically stacked into packing units by loading the articles into the respective containers 7. This significantly reduces spatial requirements. The articles 4 are conveyed in the containers 7 in a shielded manner and are thus protected from breakage or wear. The containers may, in a very simple manner, be guided through deflectors, distributors, storage devices and conveyor tracks whereby the packing machines 10 may be utilized to an optimal capacity without creating waste. The circulating containers 7 also make possible a simple adaptation to other article shapes by replacing the containers 7 with others having the same external configuration but having an inner contour that is adapted to the shape of the new articles. The transporting, storing and distributing devices between the stacking apparatus 6 and the packing machines 10 need not be changed for such readaptation. The containers 7 have a synchronizing and storing function and thus establish a connection between the unsynchronized article delivery from the baking oven 1 and the synchronized cadence of the packing machines 10.

The stacking apparatus 6 proper will now be described in greater detail in conjunction with FIGS. 2, 3 and 4.

The conveyor belt 5 is adjoined by an additional conveyor belt 15 which terminates above and upstream of the inner wall of a cylindrical container 7 which is in readiness in the charging station 14. The containers 7 are supplied to the charging station 14 by a star-shaped indexable platform 16. The rotary platform 16 is secured to a vertical shaft 17 driven by an electromotor 18 in steps of 72° and is formed of two plates 19 and 20 which have semicircular cutouts 21 for receiving the containers 7. The containers 7 are held by a projecting flange 22 of the lower plate 20 and are guided at the outside by an arcuate guide plate 23. The flange 22 has semicircular openings 24 arranged coaxially with the openings 21. The shaft 17 carries underneath the rotary platform 16 two axially spaced guide rollers 28. Between each four of the rollers 28 a bar 29 of rectangular cross section can be coaxially shifted relative to the opening 21. Each bar 29 carries on the top a pickup base 30 and at the bottom a cam roller 31 radially oriented to the axis of the rotary table 16 as well as a carrier roller 32 arranged radially opposite to the cam roller 31. The cam roller 31 runs in a cam track or guide track 33 on the outer side face of a stationary guide cylinder 34. The cam track 33 has a lower horizontal portion 36 which extends from the charging station 14 to the loading station 35 for the empty containers 7, a portion 37 which extends helically from the loading station 35 to the charging station 14 as well as a vertical portion 38 which connects the ends of the portions 36 and 37 in the charging station 14. In the charging station 14 the carrier roller 32 extends into a helix 39 which is driven by a shaft 40 oriented parallel to the shaft 17.

In the charging station 14, immediately above the container 7, two single-pitch stacking helices 45 and 46 are supported by respective vertical shafts 47 and 48 in a mirror-image orientation. The stacking helices 45 and 46 are arranged on either side of, and symmetrically to, the vertical longitudinal central plane of the conveyor belt 15. Shafts 47 and 48 are connected to one another at their other end by gears 49 of identical size to provide for opposite, synchronous rotation of the stacking helices 45 and 46. The shaft 48 is driven by a stepping motor 50 and the shaft 47 is connected to the shaft 40 by a spur gear pair 51.

In alignment with the conveyor belt 15, downstream of the stacking helices 45 and 46 and above the container 7, adjacent the inner wall thereof there is arranged a stop 55 which is slightly resilient and is formed, for example, as a flat bar made of polyamide. It may carry a shock-absorbing layer, for example, of foam rubber, on that side which is oriented towards the conveyor belt 15. The stop 55 may be lifted by a pneumatic cylinder unit 56 vertically from its base position shown in FIGS. 2 and 4 in which it abuts the articles 4 delivered by the conveyor belt 15, into a raised position to permit—in case of malfunctioning of the apparatus—article fragments to be blown out by means of compressed air from the stacking helices 45 and 46 and may be deposited on a chute 57 which leads to a waste container, not shown.

In the description which follows, the operation of the stacking device 6 will be set forth.

On the conveyor belt 5 articles 4, such as flat confectionery items, are advanced continuously in the conveying direction at a random spacing from one another. The conveyor belt 15 which follows the conveyor belt 5 runs faster than the latter in order to ensure that between consecutive items 4 a space will be present even if the articles are closely behind one another on the conveyor belt 5. An optical barrier 58 situated immediately upstream of the charging station 14 transmits a signal each time an item 4 passes. After an appropriate delay dependent upon the speed of the conveyor belt 15 and the distance between the optical barrier 58 and the abutment 55, the signal generated by the optical barrier 58 causes the stepping motor 50 to rotate the shafts 47, 48 one full revolution.

Upon rotation of the shaft 47, 48, the item 4 arrested by the stop 55 is lowered by the turning stacking helices 45, 46 and deposited thereby on the top of the article stack 59 situated in the container 7 which is located in the charging station 14. With the stacking helices 45 and 46 a downward conveyance may be achieved whose speed exceeds that of the article velocity which would be due solely to gravity. Thus, the articles 4 may be deposited to form the stack 59 in a very rapid sequence. At the same time, the spur gear pair 51 rotates the helix 39 and, as a result, the carrier roller 32 and thus the bar 29 are moved downwardly such that the pickup base 30 is lowered to an extent which corresponds to the thickness of one article. The revolutions of the stepping motor 50 are counted. When the stack 59 contains the intended number of items 4, the turntable 16 is rotated one step, whereby an empty container 7 is moved from the standby position 60 into the charging station 14. The pickup base 30 which has already been raised in the empty container 7 is moved by the portion 37 of the cam track 33 into the upper end position and the associated carrier roller 32 extends into the helix 39 in the charging station 14.

Figure 3:
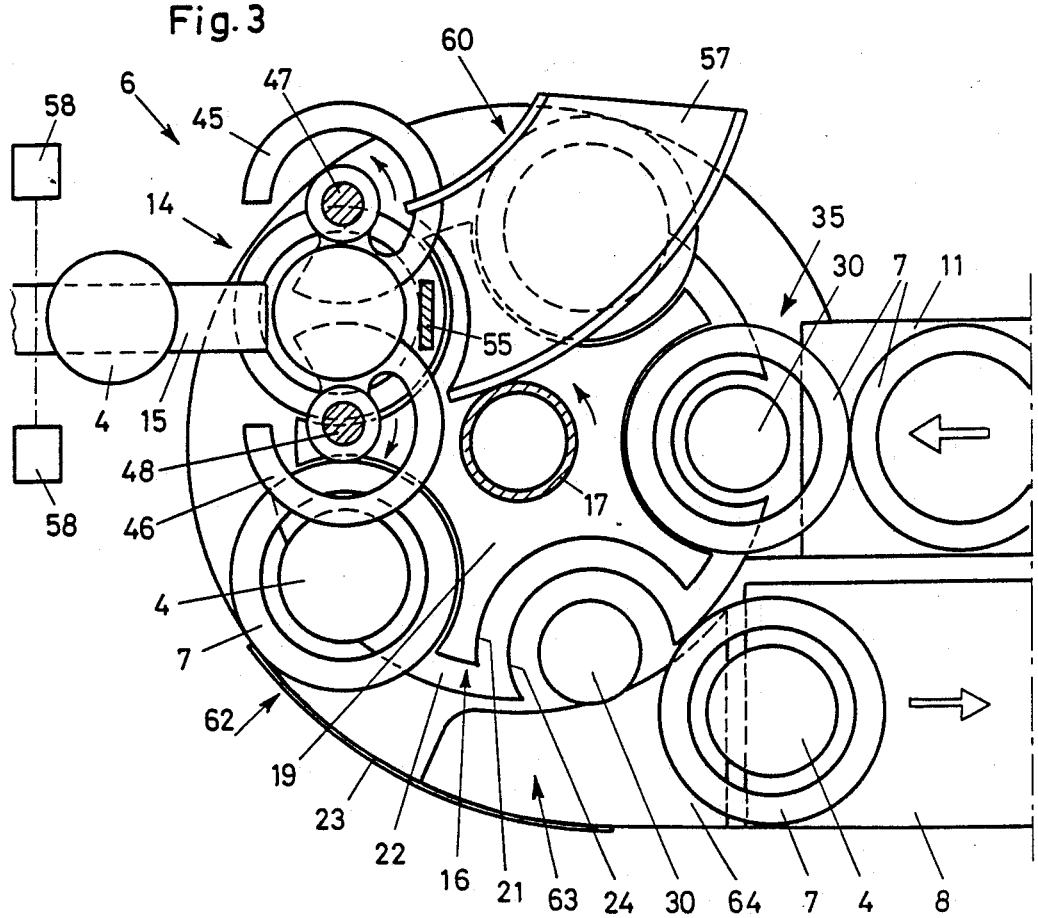
FIG. 3 is a sectional top plan view taken along line III—III of FIG. 2.

The filled container 7 in which the lowermost item of the article stack 59 is supported on pins 61 held at the lower end of the container 7, is admitted to a standby station 62 (FIG. 3). A monitoring device 65 is arranged in the unloading station 63 of in the standby station 62 for measuring the height of the article stacks 59. In order to make possible a complete removal of the pickup base 30 from the filled container 7 during this motion, the guide track portion 36 on the cylinder 34 between the charging station 14 and the standby station 62 may be inclined slightly in the downward direction.

The filled container 7 which was previously positioned in the standby station 62 is, upon rotation of the turntable 16, shifted to a removal or unloading station 63 and, during this occurrence, runs up on an approximately horizontally oriented support plate 64. From the support plate 64 the container 7 is, during the subsequent rotation of the platform 16, pushed by the next container 7 onto the conveyor belt 8 and is moved away thereby. From the conveyor belt 11 the empty containers 7 are continuously placed into the openings 21 of the turntable 16 in the loading station 35. The step length of the turntable 16 is designed to be so short that in general the subsequent item 4 can already be deposited in the new, empty container 7. If malfunctioning occurs, for example, an article having excessive dimensions is jammed in the stacking helices 45, 46, the article supply is interrupted, the stop 55 is raised by the cylinder 56 and the signal emitted by the optical barrier 58 to the stepping motor 50 is interrupted. By means of a compressed air blast the jammed article is blown out from between the stacking helices 45 and 46 and deposited on a chute 57 for further transport to a waste container, not shown.

By virtue of the above-described stacking apparatus 6, it is possible to stack the confectionery items 4 directly into stacks having a predetermined number of items for packaging, as they arrive from the baking oven 1 in an irregular spacing from one another. In contradistinction to known grouping devices such as disclosed in U.K. Patent No. 1,413,970 or U.S. Pat. No. 4,209,960, no accumulation or crowding of the items to be grouped is necessary so that the items are treated gently. Also, no intermediate magazine for forming the groups is needed.

Figure 2:
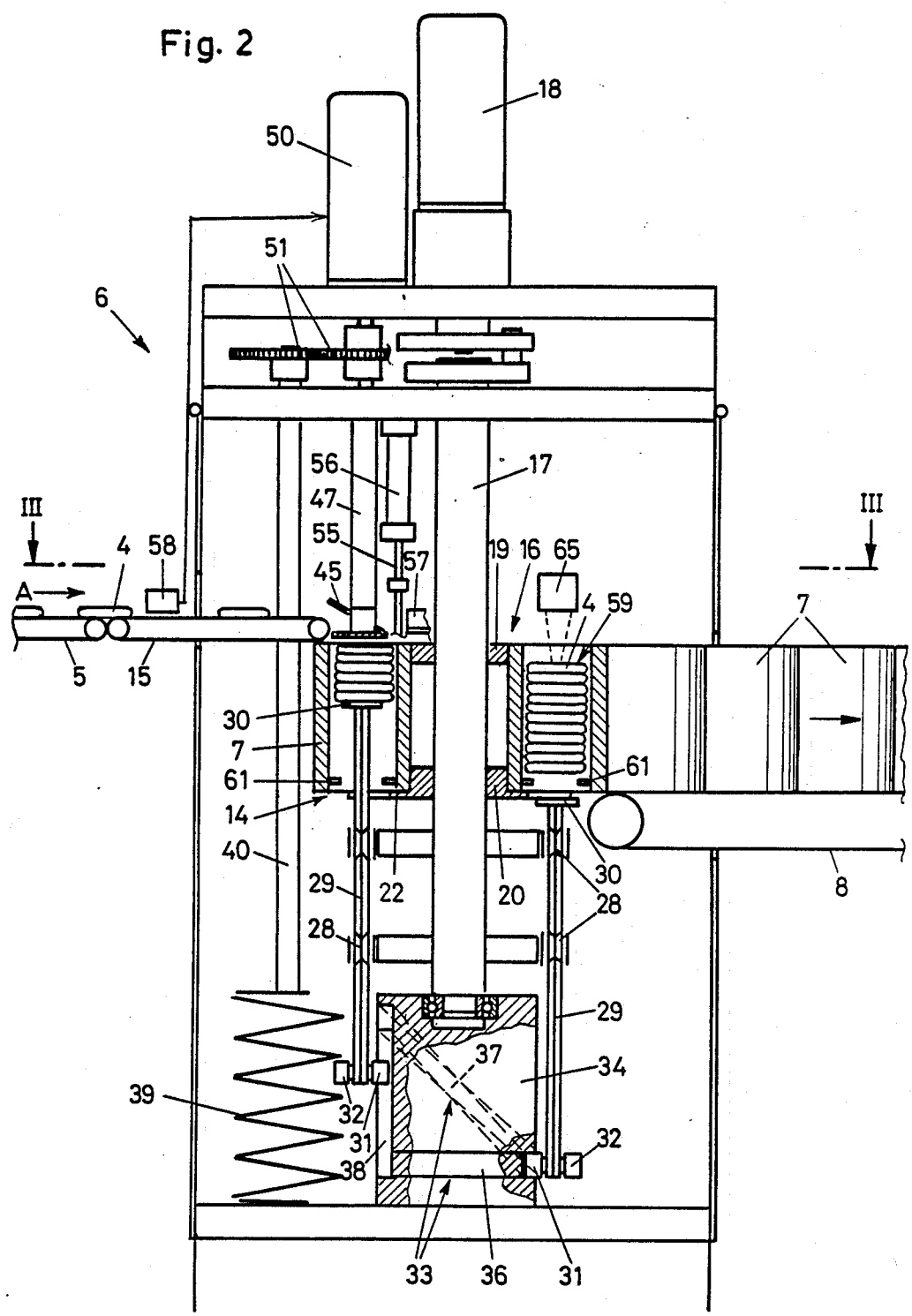
FIG. 2 is a schematic sectional side elevational view of a preferred embodiment of the invention.
Figure 4:
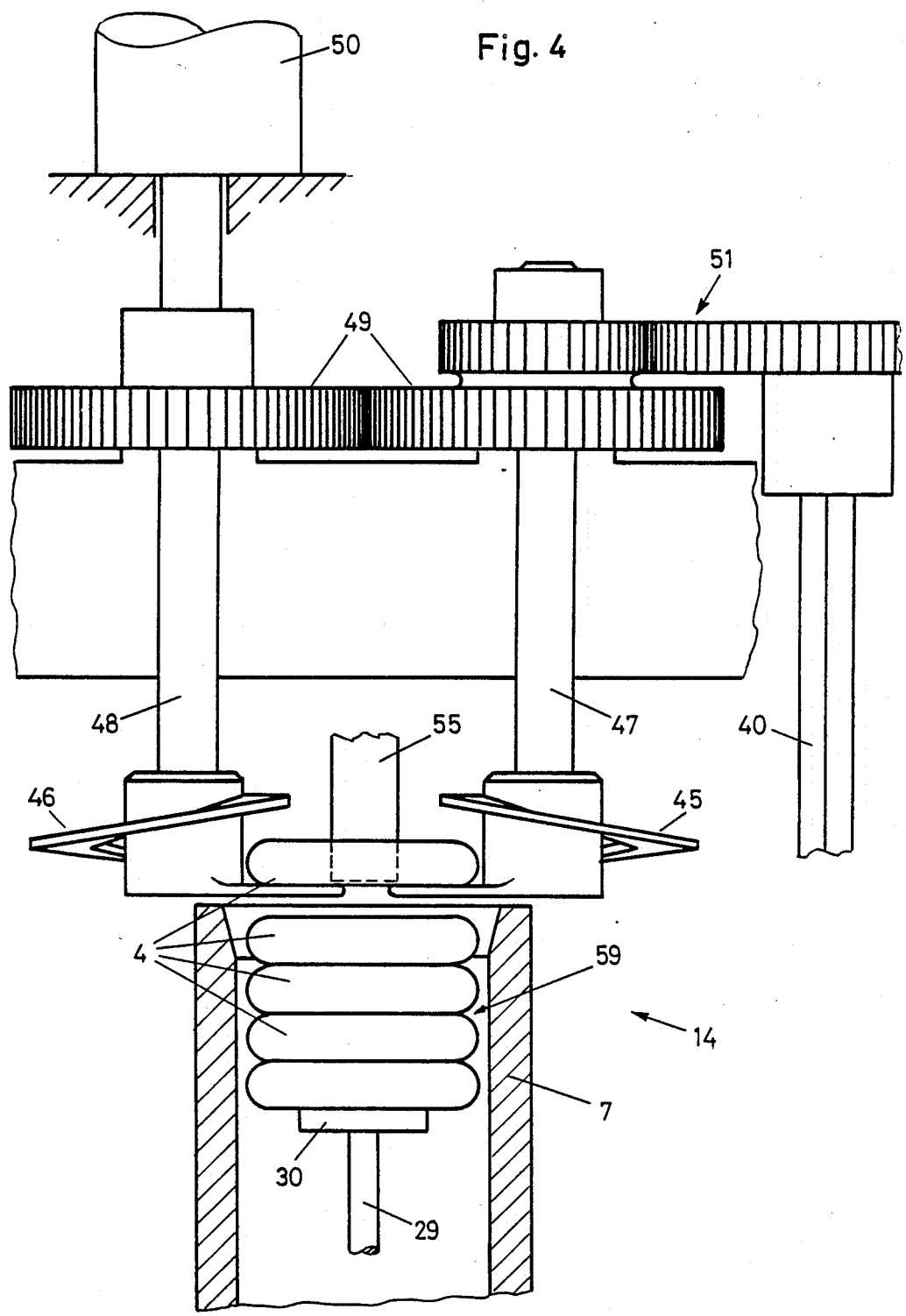
FIG. 4 is a sectional end elevational view of an enlarged detail shown in FIGS. 2 and 3.

In the embodiment illustrated in FIGS. 2, 3 and 4, the stacking helices 45 and 46 have a pitch which is slightly greater than the thickness of an item 4. The helices 45 and 46 execute one revolution as each item is received thereby and individually deposit the item on the top of the stack 59 which is being formed.

Figure 5:
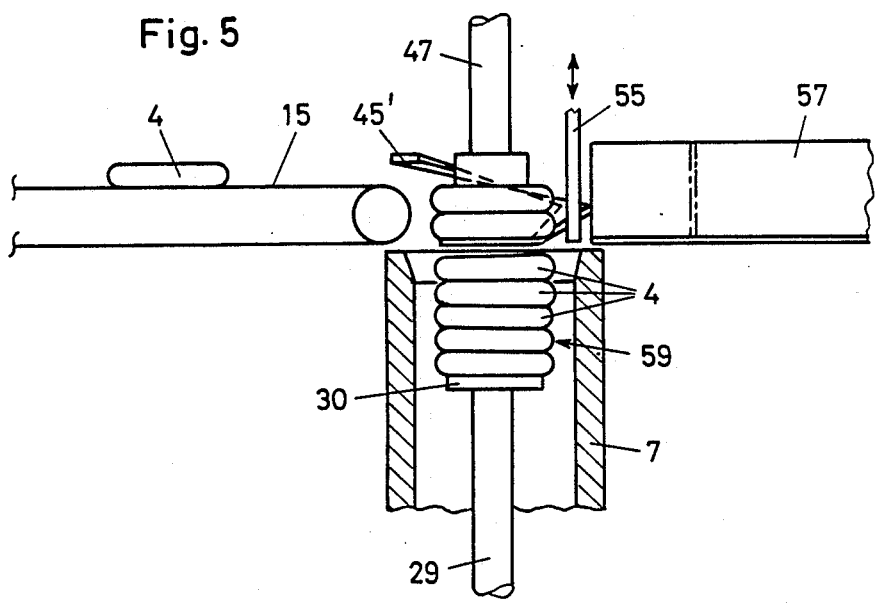
FIG. 5 is a schematic sectional side elevational view of another preferred embodiment of the invention.

Turning now to the embodiment illustrated in FIG. 5, the pitch of the stacking helices, of which only the helix 45' is shown, is twice as large as in the first embodiment and these helices execute one full revolution only for every other item and thus deposit at each time simultaneously two items 4 onto the stack 59. This arrangement has the advantage that more time is available for the turntable 16 to perform its rotary step.

Figure 6:
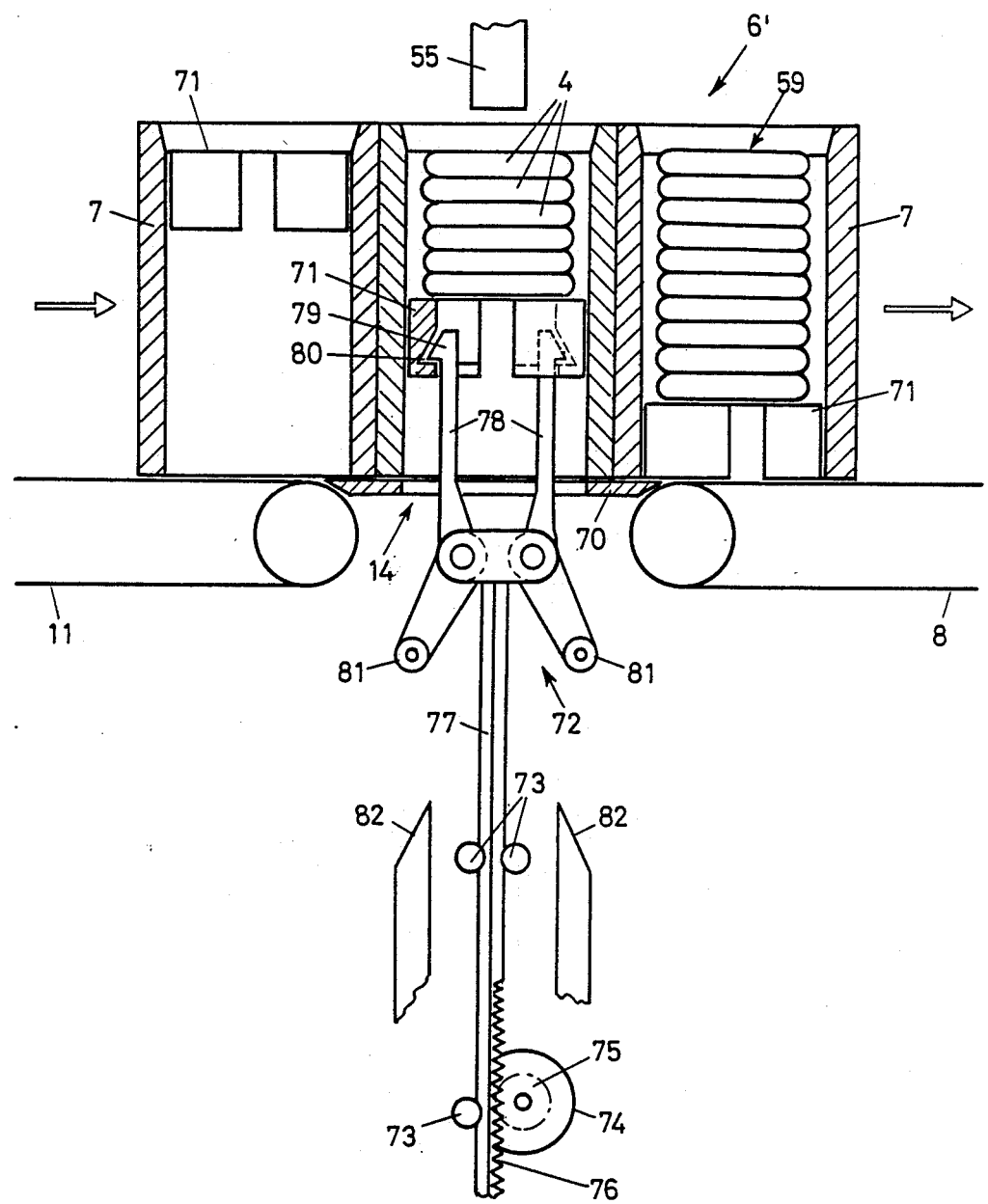
FIG. 6 is a schematic sectional side elevational view of a further preferred embodiment of the invention.

Turning now to the embodiment illustrated in FIG. 6, there is illustrated therein a stacking apparatus 6'. In this arrangement the conveyor belts 11 and 8 are in longitudinal alignment with one another. The empty containers 7 are moved by the conveyor belt 11 onto a stationary table 70 in the charging station 14 against a non-illustrated stop which may be moved clear of the travelling path of the container 7. Each container 7 has a pickup base 71 frictionally held at the inner wall of the container and positioned in an upper limit position when the container 7 is empty.

In the charging station 14 a grasping device 72 is introduced from below into the empty container 7 which has just arrived into the charging station 14. The grasping device 72 is mounted on a vertically oriented bar 77 which has a rectangular cross section and which is guided by rollers 73. The bar 77 is moved vertically along its longitudinal axis by means of a motor 74, for example, with the intermediary of a pinion 75 and a toothed rack 76. The grasping device 72 has two two-arm pivotal levers 78. The free end of the upper arm of each lever 78 has a hook 79 which, upon introducing the grasping device 72 into the container 7, engages into a groove 80 of the pickup base 71. In the charging station 14 the pickup base 71 is shifted successively downwardly in synchronism with the incoming items 4. The lower arms of each pivotal lever 78 carrY a roller 81 which, when the pickup base 71 nears its lowermost position, runs up on a respective oblique ramp 82 and swings the pivotal lever 78 such that the hooks 79 move out of the groove 80 of the pickup base 71, and the grasping device 72 thus may be lowered below the upper face of the table 70. Thereafter, the stop which has held the container 7 in the charging station 14 is moved out of the way and the charged container 7 is, by the subsequent empty container 7, pushed onto the conveyor belt 8 and is moved away thereby.

By virtue of the separate drive for the pickup base 71 there is possible a simple conversion of the stacking device to other item thicknesses or to a different number of items in each stack 59 in the containers 7. The grasping device 72 may be, however, similarly to the embodiment illustrated in FIGS. 2, 3 and 4, mounted on a platform to circulate as the platform rotates.

The containers 7 may be emptied in the packing machine 10 on a rotary platform (which is analogous to the platform 16) by means of pushers which are similar to the pickup bases 30 of the embodiment illustrated in FIGS. 2, 3 and 4. The motion of the pushers and the rotation of the rotary platform is synchronized with the operating cycle of the packing machine 10.

The containers 7 have an inner configuration which is adapted to the items 4 to be packaged and may be, for example, of prismatic configuration in case of rectangular items. They may also be formed of a support ring and parallel bars extending therefrom.

It will be understood that the above description of the present invention is susceptible to various modifications, changes and adaptations, and the same are intended to be comprehended within the meaning and range of equivalents of the appended claims.

What is claimed is:

1. A stacking apparatus for forming groups of face-to-face contacting flat items, comprising
   (a) a supply conveyor means for advancing a column of serially arranged, flat-lying items;
   (b) a stack-forming unit situated in a charging station and arranged for sequentially receiving the items from said supply conveyor means;
   (c) a plurality of stacking containers each having an inner volume for accommodating a stack of the items and having at least one open end face;
   (d) means for positioning an empty one of said stacking containers in said charging station such that the open end face of said stacking container adjoins said stack-forming unit;

(e) a stop means arranged in said charging station for arresting each item in said stack-forming unit upon delivery by said supply conveyor means;

(f) intermittent actuating means for causing said stack-forming unit to cyclically deposit an item in said stacking container to form an article stack therein; said intermittent actuating means including (1) a sensor means for generating a signal indicating a presence of an item to be deposited by said stack-forming unit; said sensor means being situated upstream of said stack-forming unit as viewed in a direction of advance of the articles on said supply conveyor means; and (2) moving means connected to said sensor means and said stack-forming unit for causing said stack-forming unit to perform an item depositing step upon receiving said signal from said sensor means;

(g) a removal conveyor means for moving away filled stacking containers from said stack-forming unit;

(h) means for transferring a filled stacking container from the charging station to said removal conveyor means;

(i) a rotary platform including means for supporting a plurality of stacking containers in a circular array; said charging station being situated adjacent said rotary platform;

(j) a loading station situated adjacent said rotary platform;

(k) means for placing an empty stacking container into said rotary platform in said loading station;

(l) an unloading station situated adjacent said rotary platform; said means for transferring a filled stacking container being situated in said unloading station;

(m) indexing means for stepwise turning said rotary platform to successively move the stacking containers from the loading station to the charging station and from the charging station to the unloading station;

(n) a plurality of pickup bases;

(o) means for supporting each said pickup base for vertical reciprocation;

(p) means for moving said pickup bases s a unit in synchronism with said rotary platform; each said pickup base being arranged to be in alignment with a respective said stacking container positioned in said rotary platform;

(q) a follower means secured to each said pickup base;

(r) means defining a first guide track extending helically from said loading station to said charging station for receiving each said follower and for shifting each pickup base upwardly into a respective stacking container as the stacking container moves from the loading station into the charging station;

(s) means defining a second guide track extending vertically in said charging station for receiving each said follower and for guiding the pickup base downwardly into a lowermost position out of the stacking container in said charging station;

(t) means defining a third guide track extending generally horizontally and receiving each said follower for maintaining each pickup base in the lowermost position as the stacking container moves from the charging situation to the unloading station; and (u) means for stepwise lowering the pickup base in said charging station within the stacking container dwelling in said charging station, in synchronism with the performance of each depositing step of said stack-forming unit.

2. A stacking apparatus as defined in claim 1, wherein said sensor means comprises an optical barrier.

3. A stacking apparatus as defined in claim 1, further comprising an additional conveyor situated upstream of said supply conveyor means for feeding the items thereto; said additional conveyor having a conveying speed less than that of said supply conveyor means.

4. A stacking apparatus as defined in claim 1, wherein said stack-forming unit comprises two vertically oriented stacking helices spaced from one another such as to be adapted to simultaneously engage opposite marginal portions of the items to be deposited thereby; each said stacking helix being secured to a respective, vertically oriented shaft forming part of said moving means; and means, forming part of said moving means, for rotating the shafts in opposite rotary directions relative to one another.

5. A stacking apparatus as defined in claim 4, wherein each said stacking helix has a pitch corresponding to the thickness of one item.

6. A stacking apparatus as defined in claim 4, wherein each said stacking helix has a pitch corresponding to twice the thickness of one item.

7. A stacking apparatus as defined in claim 1, wherein said rotary platform has a rotary axis; said means for stepwise lowering the pickup base comprises a helix extending about said rotary axis and supported for rotation; further comprising an additional follower carried by each said pickup base; each follower being arranged to engage into said helix upon arrival of the respective pickup base into said charging station from said loading station; and means for stepwise rotating said helix in synchronism with the performance of each item depositing step for a stepwise lowering of said pickup base in said charging station.

8. A stacking apparatus as defined in claim 7, wherein said means defining said first, second and third guide tracks comprises a stationary cylinder axially aligned with said rotary axis and having a cylinder face; said first, second and third guide tracks being constituted by grooves formed in said cylinder face.

9. A stacking apparatus as defined in claim 1, further comprising means for moving said stop means clear of a travelling path of the items on said supply conveyor means.

* * * * *